US006981246B2

(12) United States Patent
Dunn

(10) Patent No.: US 6,981,246 B2
(45) Date of Patent: Dec. 27, 2005

(54) METHOD AND APPARATUS FOR AUTOMATIC ACCESSIBILITY ASSESSMENT

(75) Inventor: Jeffrey J. Dunn, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 660 days.

(21) Appl. No.: 09/858,992

(22) Filed: May 15, 2001

(65) Prior Publication Data

US 2004/0015862 A1 Jan. 22, 2004

(51) Int. Cl.[7] .................................................. G06F 9/44
(52) U.S. Cl. ...................................................... 717/127
(58) Field of Search ................................ 717/124–135; 714/1, 25, 37–38, 47–49; 703/22

(56) References Cited

U.S. PATENT DOCUMENTS

| | | | | |
|---|---|---|---|---|
| 6,446,224 B1 | * | 9/2002 | Chang et al. ................... | 714/54 |
| 6,598,179 B1 | * | 7/2003 | Chirashnya et al. ........... | 714/37 |
| 6,615,157 B1 | * | 9/2003 | Tsai ............................ | 702/179 |
| 6,738,727 B2 | * | 5/2004 | Chang ......................... | 702/167 |
| 6,829,746 B1 | * | 12/2004 | Schwerdtfeger et al. ..... | 715/523 |

2002/0059093 A1 * 5/2002 Barton et al.

* cited by examiner

Primary Examiner—Wei Y. Zhen
(74) Attorney, Agent, or Firm—Osha Liang LLP

(57) ABSTRACT

The present invention provides a method and apparatus for automatic accessibility assessment. One embodiment of the present invention automatically executes and tests the accessibility of a computer program. This embodiment analyzes the executing computer program to determine whether enough information is presented for assistive technologies to work properly with the computer program. Another embodiment manipulates the user interface by simulating interactions with assistive technologies. Thus, it is determined which portion of the computer program's functionality is reachable through interaction with the simulated assistive devices. One embodiment allows a user to select states for testing which are otherwise unreachable by the simulated assistive devices. The computer program's interactions with the simulated assistive devices are used to determine whether any accessibility failures exist in the computer program. One embodiment is designed to test computer programs written in a platform-independent programming language. One embodiment is designed to test computer programs written in the Java programming language. Other embodiments are designed to test computer programs written in other programming languages.

36 Claims, 5 Drawing Sheets

METHOD AND APPARATUS FOR AUTOMATIC ACCESSIBILITY ASSESSMENT

BACKGROUND OF THE INVENTION

1. Field of the Invention

The present invention relates to the field of computer software, and in particular to a method and apparatus for automatic accessibility assessment.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computer programs make use of many input and output devices termed "interfaces." However, some disabled users are unable to make use of all interfaces. Such users frequently rely on a set of interfaces termed "assistive technologies." Thus, computer programs are tested for accessibility by testing whether they are compatible with assitive technologies. Current methods for accessibility testing require a human to manually and exhaustively test each aspect of a computer program for accessibility. This is expensive and does not prevent the possibility of human error. This problem can be better understood with a review of computer program accessibility.

Computer Program Interface

Computer programs execute a series of program statements to manipulate data. During execution, a computer program frequently provides data (output) to a user. Typical output devices include monitors, printers and speakers. During execution, a computer program also frequently receives data (input) from a user. Typical input devices include keyboards, mice, touch-sensitive monitors and microphones. A computer program interface is the means by which a user gives input to the computer program and receives output from the computer program.

Accessibility

Some users are unable to use certain computer program interfaces. For example, a blind user could not typically position a pointer on a monitor over a desired field using a mouse pointer since the only indication the pointer is in the correct position is visual. However, such limitations are overcome by taking accessibility into account when designing computer programs. For example, visual limitations are overcome by audio cues used to indicate the position of a mouse pointer in relation to objects on the screen. Additionally, a program may allow a user to operate the program using a keyboard as an input device exclusively. Thus, a blind user could use keystrokes to select a desired field. Additionally, some users with a disability make use of assitive technologies, such as screen readers, alternate keyboards and eye-following devices, to interface with computer programs.

It is necessary to test the accessibility of a computer program to determine whether a computer program is accessible to users with a disability. Prior art methods of accessibility testing include examining source code and exhaustively manually testing of computer programs.

Source Code

One method of ensuring computer program accessibility is to exhaustively examine the source code. A programmer selects an untested function of the computer program and determines whether the computer code provides a means for all types of limited users to access the function of the computer program. If computer code provides a means for all types of limited users to access the function of the computer program, the programmers selects another untested function until all functionality of the computer program is tested.

Whenever the programmer determines that the computer code does not provide a means for some types of limited users to access the function, the programmer notes the accessibility failure. Once the accessibility failures are known, either the computer program is modified to correct the failures or the failures are documented and left in the computer program. However, source code is not always available for testing. Additionally, human error is not prevented with this method. Thus, accessibility failures may remain undetected.

Exhaustive Manual Testing

Some human error is eliminated by another method of ensuring computer program accessibility. The computer program is executed and exhaustively manually tested as it executes. A technician begins execution of an assistive technology (e.g., a screen reader or magnifier). Then, the technician begins program execution and begins using the program. The technician selects untested functions of the computer program and determines whether the computer program provides access using the assistive technology. All accessibility failures are logged as they are encountered. By repeating this process with multiple assistive technologies, the technician determines whether the program provides a means for users with all types of disabilities to access the functions of the computer program.

Once the accessibility failures are known, either the computer program is modified to correct the failures or the failures are documented and left in the computer program. However, human error is not completely eliminated with this method. Thus, accessibility failures may remain undetected. Additionally, this method requires that the technician install the various assitive technologies before testing begins. Installing all assitive technologies for testing purposes is expensive and beyond the financial ability of some computer program creators. Additionally, human error in this process is high because the technician must be proficient in the use of all assistive technologies being tested.

HTML

In one prior art method, accessibility is automatically assessed for information stored in a format known as "Hypertext Markup Language (HTML)". This file or script format allows the display of text, graphics and audio information, and provides links to other pages of information through "hyperlinks." Hyperlinks are strings of characters in a particular format that specify the address of the desired page of information.

In particular, HTML is a system for marking documents to indicate how the document should be displayed, and how various documents should be linked together. HTML is a form of Standard Generalized Markup Language (SGML), defined by the International Standards Organization. HTML specifies the grammar and syntax of markup tags which are inserted into a data file to define how the data will be presented when read by a computer program known as a "web browser". Conventional web browsers include Internet Explorer, Netscape Navigator, and others.

The data file, which is typically stored on a server, includes one or more web pages which are visited by users who have computers which may run different browsers. When a page is visited, HTML data output from the server is downloaded to the client computer. The client computer's browser processes the data to format a layout for the page so the page can be viewed by the user on a computer screen. Generally, HTML tags provide text formatting, hypertext links to other pages, and links to sound and picture elements. HTML tags also define input fields for interactive web pages.

An HTML application is made available to users on the web by storing the HTML file in a directory that is accessible to a server. Such a server is typically a web server which conforms to a web browser-supported protocol known as Hypertext Transfer Protocol (HTTP). Servers that conform to other protocols such as the File Transfer Protocol (FTP) or GOPHER may also be used, but do not support interactive HTML files.

HTTP defines a set of rules that servers and browsers follow when communicating with each other. Typically, the process begins when a user accesses an icon in an HTML page which is the anchor of a hyperlink, (for instance, by positioning a cursor on the icon and depressing a mouse button), or the user inputs a Uniform Resource Locator (URL) to his or her web browser, described below. A connection is then made to the server at the address and port number specified by the URL. Next, the browser sends a request to retrieve an object from the server, or to post data to an object on the server. The server sends a response to the browser including a status code and the response data. The connection between the browser and server is then closed.

HTML Document Accessibility

Since Hypertext Markup Language (HTML) is used to control how data in web pages is presented to a user, similar accessibility issues arise as with computer programs. For example, some web pages include visual or audio information some disabled users can not access. HTML provides a means to present alternative information when a disability makes one presentation inappropriate. For example, images are alternatively presented by textual descriptions. Then, a screen reader, an assistive technology, works in concert with a web browser to convert text into an audio format is used to present the textual descriptions to blind users. Automatic testers exist which scan the text and tags of HTML documents and log any accessibility problems. One such automatic tester is called "BOBBY" and is available for free on the world wide web.

Platform-Independent Programs

A platform-independent program (e.g., a Java program) is composed of a number of classes and interfaces. Unlike many programming languages, in which a program is compiled into machine-dependent, executable program code, platform-independent classes are compiled into machine independent bytecode class files. Each class contains code and data in a platform-independent format called the class file format. The computer system acting as the execution vehicle contains a program called a virtual machine, which is responsible for executing the code in platform-independent classes. The virtual machine provides a level of abstraction between the machine independence of the bytecode classes and the machine-dependent instruction set of the underlying computer hardware. Hence, a platform-independent language provides an example of a safe language.

A "class loader" within the virtual machine is responsible for loading the bytecode class files as needed, and either an interpreter executes the bytecodes directly, or a "just-in-time" (JIT) compiler transforms the bytecodes into machine code, so that they can be executed by the processor. FIG. 1 is a block diagram illustrating a sample platform-independent network environment comprising a client platform 102 coupled over a network 101 to a server 100 for the purpose of accessing platform-independent class files for execution of a platform-independent application or applet.

Sample Platform-Independent Network Application Environment

In FIG. 1, server 100 comprises development environment 104 for use in creating the class files for a given application. The development environment 104 provides a mechanism, such as an editor and an applet viewer, for generating class files and previewing applets. A set of core classes 103 comprise a library of classes that can be referenced by source files containing other/new classes. From development environment 104, one or more source files 105 are generated. Source files 105 contain the programmer readable class definitions, including data structures, method implementations and references to other classes. Source files 105 are provided to compiler 106, which compiles source files 105 into compiled ".class" files 107 that contain bytecodes executable by a virtual machine. Bytecode class files 107 are stored (e.g., in temporary or permanent storage) on server 100, and are available for download over network 101.

Client platform 102 contains a virtual machine 111 which, through the use of available native operating system (O/S) calls 112, is able to execute bytecode class files and execute native O/S calls when necessary during execution.

Platform-independent class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a platform-independent program to be loaded as late during the program's execution as possible; they are loaded on demand from the network (stored on a server), or from a local file system, when first referenced during the platform-independent program's execution. The virtual machine locates and loads each class file, parses the class file format, allocates memory for the class's various components, and links the class with other already loaded classes. This process makes the code in the class readily executable by the virtual machine.

SUMMARY OF THE INVENTION

The present invention provides a method and apparatus for automatic accessibility assessment. One embodiment of the present invention automatically executes and tests the accessibility of a computer program. This embodiment analyzes the executing computer program to determine whether enough information is presented for assistive technologies to work properly with the computer program.

Another embodiment manipulates the user interface by simulating interactions with assistive technologies and mainstream devices (e.g., a standard keyboard, a standard mouse, a standard monitor) as used by users with a disability. Thus, it is determined which portion of the computer program's functionality is reachable through interaction with the simulated assistive devices. One embodiment allows a user to select states for testing which are otherwise unreachable by the simulated assistive devices. The computer program's interactions with the simulated assistive devices are used to determine whether any accessibility failures exist in the computer program. In one embodiment, it is only determined whether a specified sub-set of all accessibility failures exist in the computer program.

One embodiment is designed to test computer programs written in a platform-independent programming language. One embodiment is designed to test computer programs written in the Java programming language. Other embodiments are designed to test computer programs written in other programming languages.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for automatic accessibility assessment. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

One embodiment of the present invention automatically executes and tests the accessibility of a computer program. This embodiment analyzes the executing computer program to determine whether enough information is presented for assistive technologies to work properly with the computer program.

Figure 1:
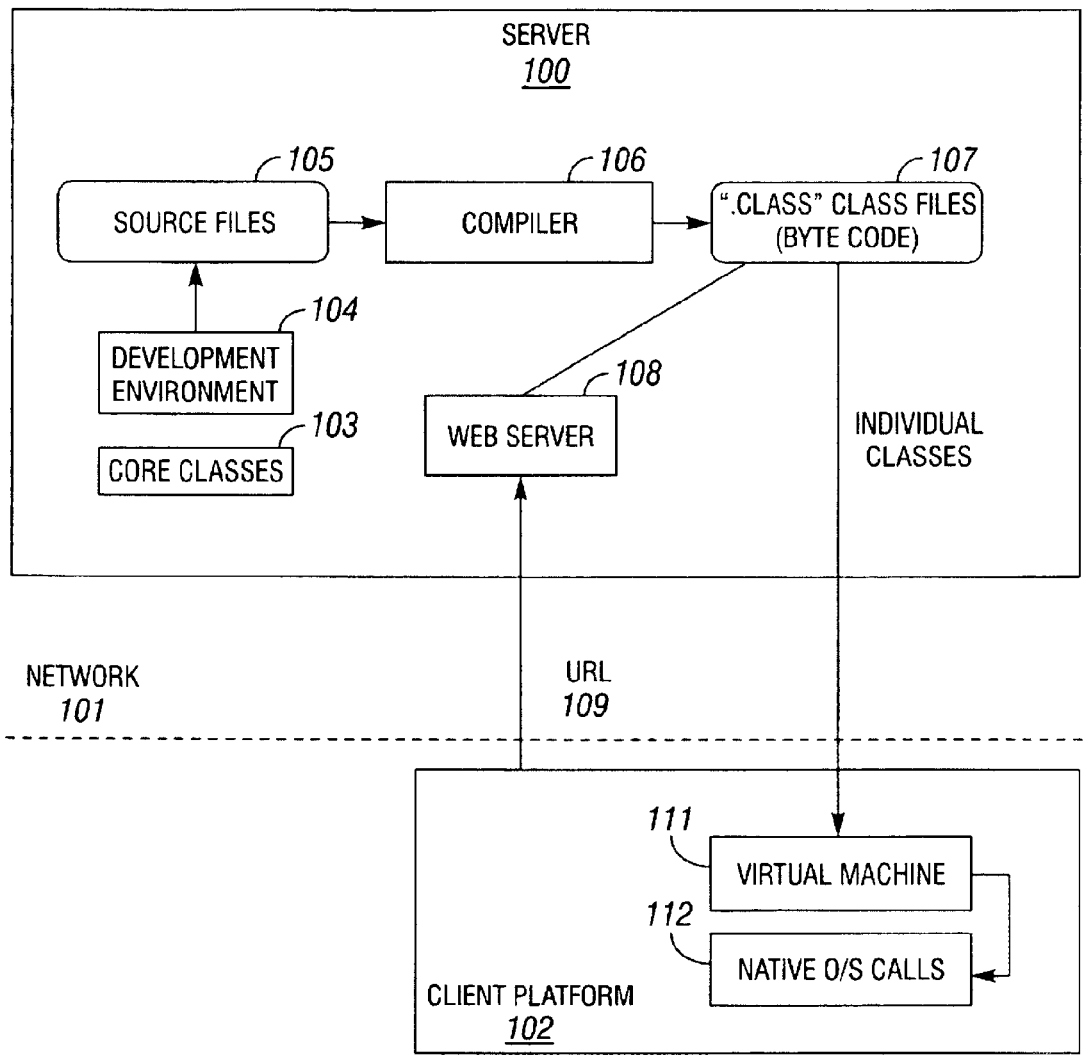
FIG. 1 is a block diagram of a sample platform-independent network environment.
Figure 2:
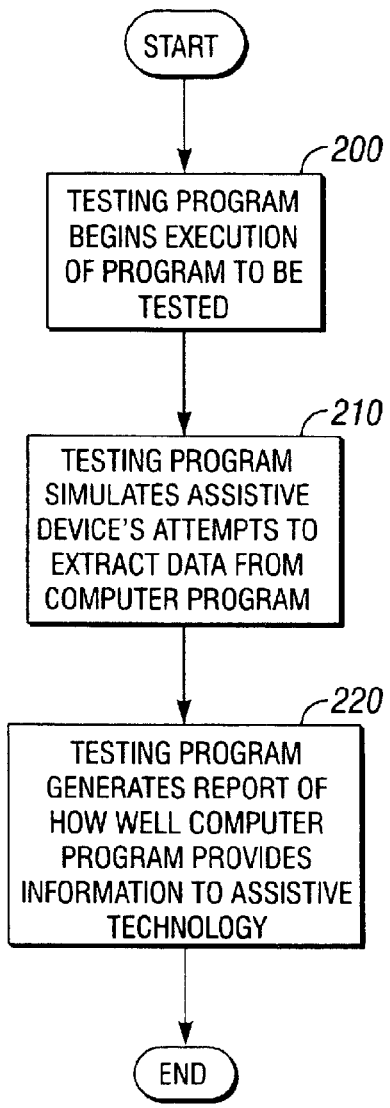
FIG. 2 is a flow diagram of the process of analyzing a computer program in accordance with one embodiment of the present invention.

FIG. 2 illustrates the process of analyzing a computer program in accordance with one embodiment of the present invention. At step 200, a testing program begins execution of a computer program to be analyzed. At step 210, the testing program simulates an assistive device's attempts to extract data from the computer program. At step 220, the testing program generates a report of how well the computer program provides information to the assistive technology.

Another embodiment manipulates the user interface by simulating interactions with assistive technologies. Thus, it is determined which portion of the computer program's functionality is reachable through interaction with the simulated assistive devices. In this embodiment, it appears as if a user is using the computer program being tested as the testing program simulates assistive technologies.

Figure 3:
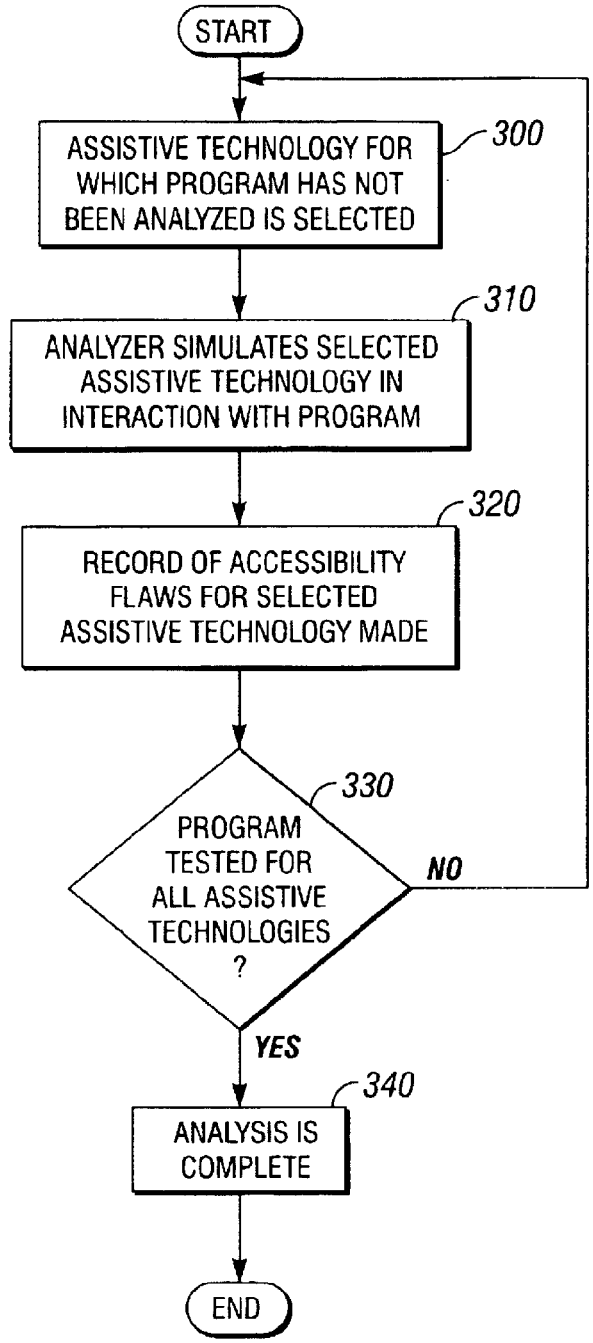
FIG. 3 is a flow diagram of the process of analyzing a computer program in accordance with one embodiment of the present invention.

FIG. 3 illustrates the process of accessibility analysis in accordance with one embodiment of the present invention. At step 300, an assistive technology for which the program has not been analyzed is selected. At step 310, the analyzer simulates the selected assistive technology in interaction with the program. At step 320, a record of accessibility flaws for the selected assistive technology is made. At step 330, it is determined whether the program is analyzed for all assistive technologies. If the program is analyzed for all assistive technologies, at step 340, the analysis is complete. If the program is not analyzed for all assistive technologies, the process repeats at step 300.

One embodiment allows a user to select states for testing which are otherwise unreachable by the simulated assistive devices. For example, the process of FIG. 3 may leave a window of a tested program untested. In this embodiment, a technician is prompted for any portions of the program which were not reach automatically. Thus, a technician could ensure that the window left untested by the process of FIG. 3 is tested. The computer program's interactions with the simulated assistive devices are used to determine whether any accessibility failures exist in the computer program.

Figure 4:
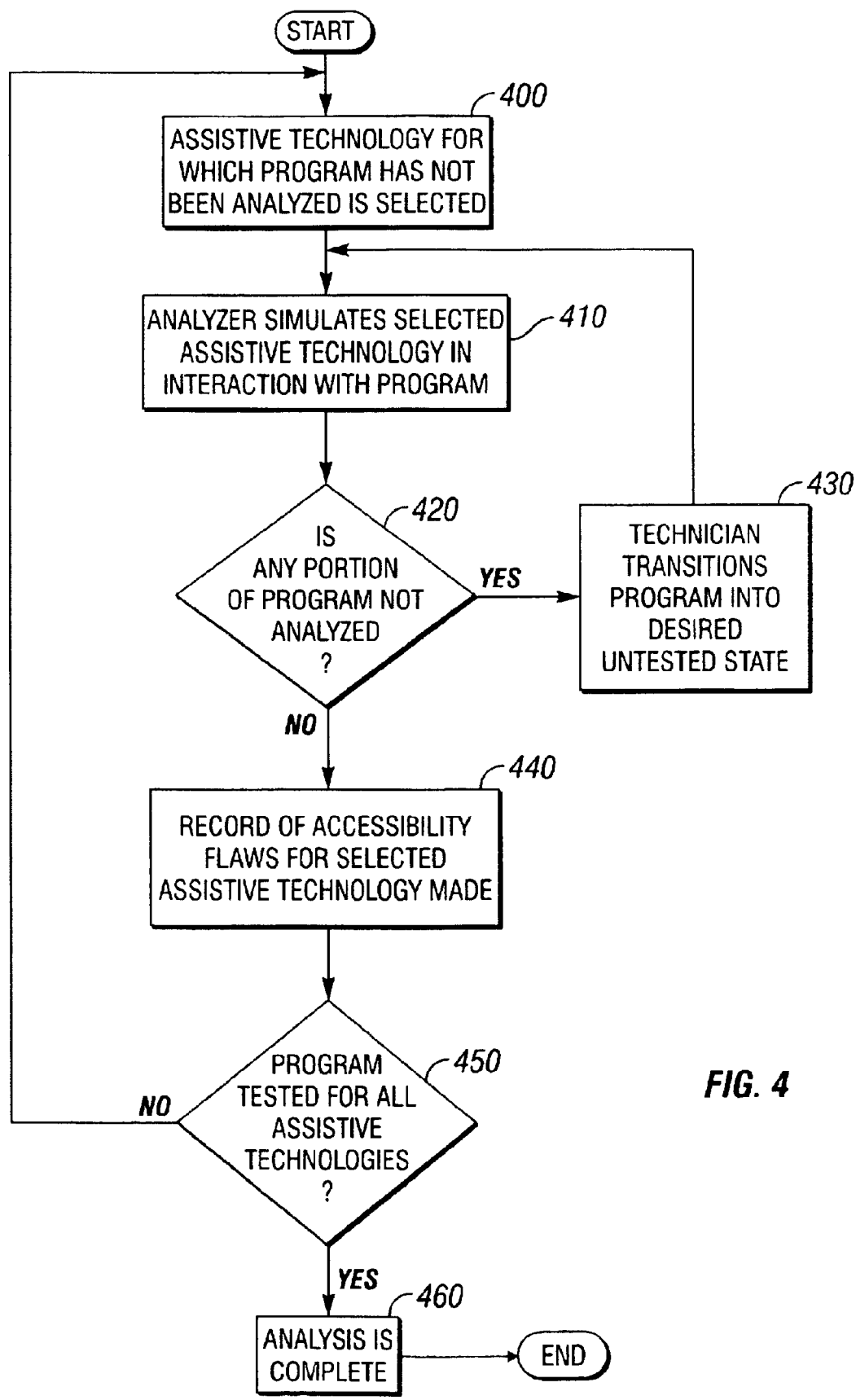
FIG. 4 is a flow diagram of the process of analyzing a computer program in accordance with one embodiment of the present invention.

FIG. 4 illustrates the process of accessibility analysis in accordance with one embodiment of the present invention. At step 400, an assistive technology for which the program has not been analyzed is selected. At step 410, the analyzer simulates the selected assistive technology in interaction with the program. At step 420, it is determined whether any portion of the program was not analyzed. If some portion of the program was not analyzed, at step 430, a technician transitions the program into the desired untested state and the process continues at step 410. If every portion of the program was analyzed, the process continues at step 440.

At step 440, a record of accessibility flaws for the selected assistive technology is made. At step 450, it is determined whether the program is analyzed for all assistive technologies. If the program is analyzed for all assistive technologies, at step 460, the analysis is complete. If the program is not analyzed for all assistive technologies, the process repeats at step 400.

One embodiment allows a programmer to select which accessibility tests are conducted. Thus, during program development, a programmer can incrementally ensure levels of accessibility are met. For example, when development time is limited, a programmer may wish to ensure a program works with assistive output devices before considering how well the program works with assistive input devices. One embodiment provides collections of accessibility tests. In this embodiment, each accessibility test of a collection is conducted on the computer program being tested.

One embodiment prioritizes accessibility failures. In one embodiment, top priority is given to failures which are universally considered unacceptable and bottom priority is given to failures which are considered unacceptable by only a few users. In another embodiment, accessibility failures are categorized by the window of the program in which they occurred.

One embodiment is designed to test computer programs written in a platform-independent programming language. One embodiment is designed to test computer programs written in the Java programming language. Other embodiments are designed to test computer programs written in other programming languages.

Figure 5:
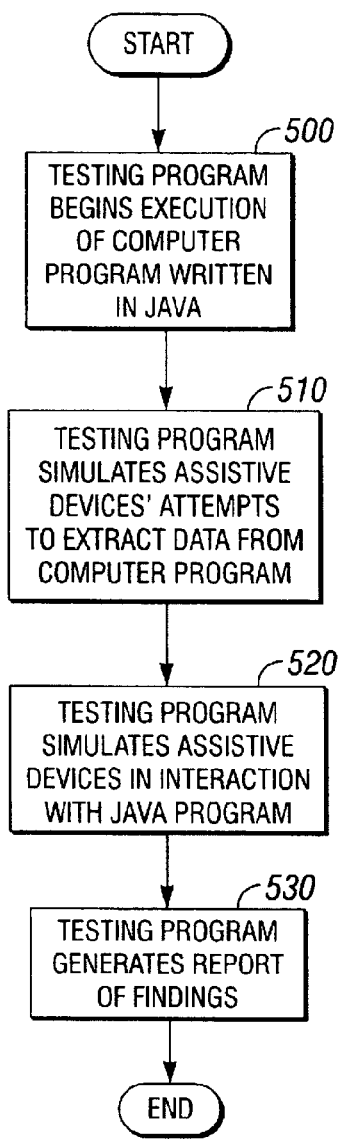
FIG. 5 is a flow diagram of the process of analyzing a computer program in accordance with one embodiment of the present invention.

FIG. 5 illustrates the process of analyzing a computer program in accordance with one embodiment of the present invention. At step 500, a testing program begins execution of a computer program written in Java. At step 510, the testing program simulates assistive devices' attempts to extract data from the computer program. At step 520, the testing program simulates assistive devices in interaction with the Java program. At step 530, the testing program generates a report of its findings.

Figure 6:
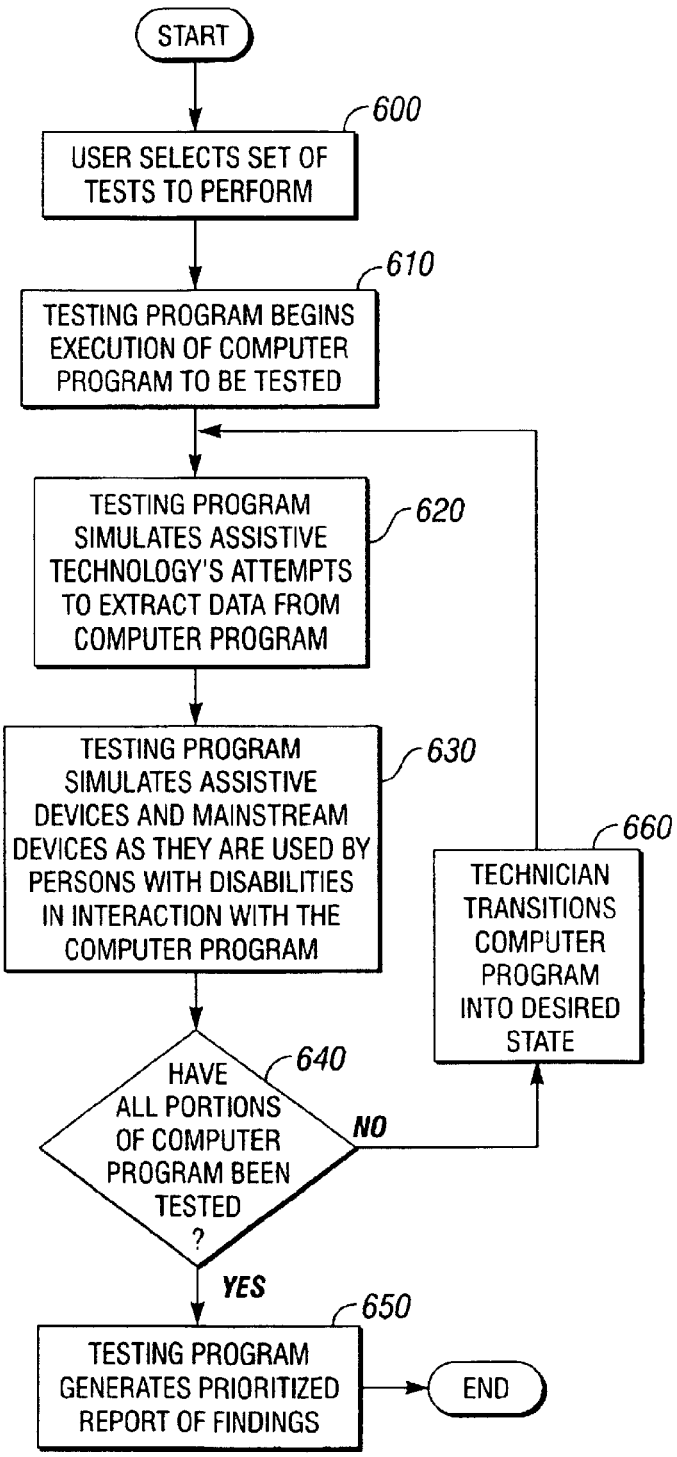
FIG. 6 is a flow diagram of the process of analyzing a computer program in accordance with one embodiment of the present invention.

In one embodiment, the user may select a set of tests to perform on a computer program. FIG. 6 illustrates the process of analyzing a computer program in accordance with one embodiment of the present invention. At step 600, a user selects a set of tests to perform. At step 610, the testing program begins execution of the program to be tested. At step 620, the testing program simulates an assistive technology's attempts to extract data from the computer program.

At step 630, the testing program simulates assistive devices and mainstream devices (e.g., a keyboard or a mouse) as they are used by persons with disabilities in interaction with the computer program. At step 640, it is determined whether all portions of the computer program have been tested. If all portions of the computer program have been tested, at step 650, the testing program generates a prioritized report of findings. If not all portions of the computer program have been tested, at step 660, a technician transitions the computer program into a desired state and the process repeats at step 620.

Embodiment of Computer Execution Environment (Hardware)

Figure 7:
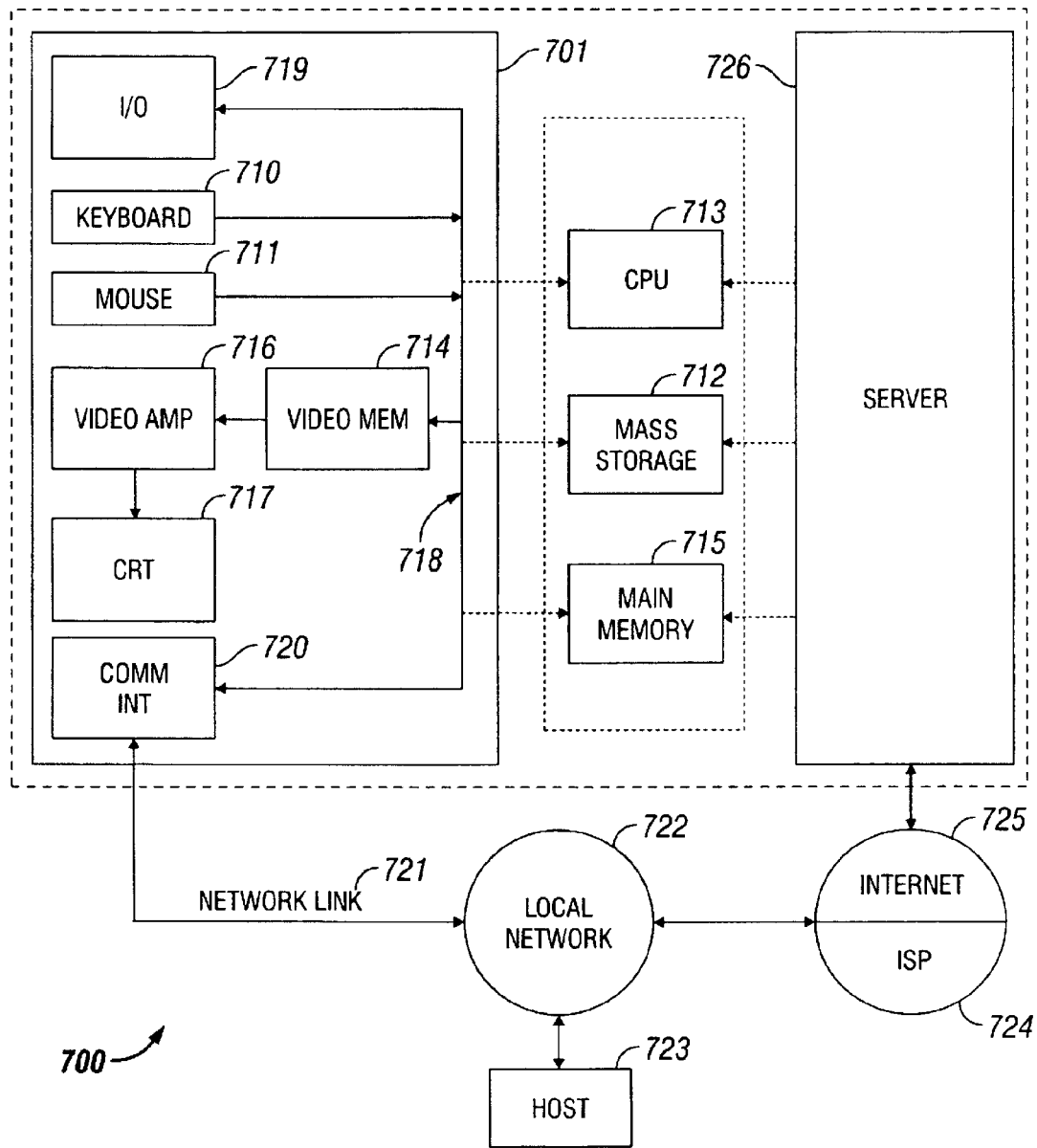
FIG. 7 is a block diagram of a general purpose computer.

An embodiment of the invention can be implemented as computer software in the form of computer readable program code executed in a general purpose computing environment such as environment 700 illustrated in FIG. 7, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices may be used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to local server computer 723 or to data equipment operated by ISP 724. ISP 724 in turn provides data communication services through the world wide packet data communication network now commonly referred to as the "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713. As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 712 may include both fixed and removable media, such as magnetic, optical or magnetic optical storage systems or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines may be used instead of separate data and address lines.

In one embodiment of the invention, the processor 713 is a SPARC microprocessor from Sun Microsystems, Inc., a microprocessor manufactured by Motorola, such as the 680×0 processor, or a microprocessor manufactured by Intel, such as the 80×86 or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for automatic accessibility assessment is described in conjunction with one or more specific embodiments. The invention is defined by the following claims and their full scope an equivalents.

What is claimed is:

1. A method of automatic accessibility assessment of a computer program comprising:
    performing one or more accessibility tests on said computer program; and
    recording how well said computer program performs on said accessibility tests, wherein the accessibility tests determine whether enough information is presented in said computer program for assistive technologies to work with said computer program.

2. The method of claim 1 wherein said step of performing comprises:
    simulating one or more assistive technologies; and
    interacting with said computer program using a first simulated assistive technology.

3. The method of claim 2 wherein said step of performing further comprises:
    interacting with said computer program using a standard input device.

4. The method of claim 2 wherein said step of performing further comprises:
    interacting with said computer program using a standard output device.

5. The method of claim 2 wherein said step of interacting comprises:
    transitioning through one or more states of said computer program.

6. The method of claim 5 wherein said step of transitioning is performed by a person.

7. The method of claim 2 wherein said step of interacting is performed automatically.

8. The method of claim 1 wherein said computer program is written in a platform-independent programming language.

9. The method of claim 8 wherein said platform-independent programming language is Java.

10. The method of claim 1 wherein step of performing comprises:
    determining whether one or more data items are present wherein said data items are used by an assistive device.

11. The method of claim 1 wherein said step of recording comprises:
    prioritizing a list of accessibility failures.

12. The method of claim 1 wherein said step of recording comprises:
    categorizing an accessibility failure by a state of said computer program wherein said accessibility failure occurred in said state.

13. An automatic accessibility assessor comprising:
    a tester configured to perform one or more accessibility tests on a computer program; and
    a recorder configured to record how well said computer program performs on said accessibility tests.
    wherein said accessibility tests determine whether enough information is presented in said computer program for assistive technologies to work with said computer program.

14. The automatic accessibility assessor of claim 13 wherein said tester comprises:
    a simulator configured to simulate one or more assistive technologies; and
    an interface device configured to interact with said computer program using a first simulated assistive technology.

15. The automatic accessibility assessor of claim 14 wherein said tester further comprises:
    a second interface device configured to interact with said computer program using a standard input device.

16. The automatic accessibility assessor of claim 14 wherein said tester further comprises:
    a third interface device configured to interact with said computer program using a standard output device.

17. The automatic accessibility assessor of claim 14 wherein said interface device is further configured to transition through one or more states of said computer program.

18. The automatic accessibility assessor of claim 17 wherein said interface device is further configured to accept an input from a person.

19. The automatic accessibility assessor of claim 14 wherein said interface device is further configured to perform automatically.

20. The automatic accessibility assessor of claim 13 wherein said computer program is written in a platform-independent programming language.

21. The automatic accessibility assessor of claim 20 wherein said platform-independent programming language is Java.

22. The automatic accessibility assessor of claim 13 wherein said tester comprises:
    a determiner configured to determine whether one or more data items are present wherein said data items are used by an assistive device.

23. The automatic accessibility assessor of claim 13 wherein said recorder is further configured to prioritize a list of accessibility failures.

24. The automatic accessibility assessor of claim 13 wherein said recorder is further configured to categorize an accessibility failure by a state of said computer program wherein said accessibility failure occurred in said state.

25. A computer program product comprising:
    a computer usable medium having computer readable program code embodies therein configured for automatic accessibility assessment of a first computer program, comprising:
    computer readable code configured to cause a computer to perform one or more accessibility tests on a computer program; and computer readable code configured to cause a computer to record how well said computer program performs on said accessibility tests, wherein said accessiblitiy tests determine whether enough information is presented in said computer program for assistive technologies to work with said computer program.

26. The computer program product of claim 25 wherein said computer readable code configured to cause a computer to perform comprises:

computer readable code configured to cause a computer to simulate one or more assistive technologies; and computer readable code configured to cause a computer to interact with said computer program using a first simulated assistive technology.

27. The computer program product of claim 26 wherein said computer readable code configured to cause a computer to perform further comprises:

computer readable code configured to cause a computer to interact with said computer program using a standard input device.

28. The computer program product of claim 26 wherein said computer readable code configured to cause a computer to perform further comprises:

computer readable code configured to cause a computer to interact with said computer program using a standard output device.

29. The computer program product of claim 26 wherein said computer readable code configured to cause a computer to interact comprises:

computer readable code configured to cause a computer to transition through one or more states of said computer program.

30. The computer program product of claim 29 wherein said computer readable code configured to cause a computer to interact further comprises:

computer readable code configured to cause a computer to accept an input from a person.

31. The computer program product of claim 26 wherein said computer readable code configured to cause a computer to interact comprises:

computer readable code configured to cause a computer to perform automatically.

32. The computer program product of claim 25 wherein said computer program is written in a platform-independent programming language.

33. The computer program product of claim 32 wherein said platform-independent programming language is Java.

34. The computer program product of claim 25 wherein said computer readable code configured to cause a computer to perform comprises:

computer readable code configured to cause a computer to determine whether one or more data items are present wherein said data items are used by an assistive device.

35. The computer program product of claim 25 wherein said computer readable code configured to cause a computer to record comprises:

computer readable code configured to cause a computer to prioritize a list of accessibility failures.

36. The computer program product of claim 25 wherein said computer readable code configured to cause a computer to record comprises:

computer readable code configured to cause a computer to categorize an accessibility failure by a state of said computer program wherein said accessibility failure occurred in said state.

* * * * *